Patented June 11, 1929.

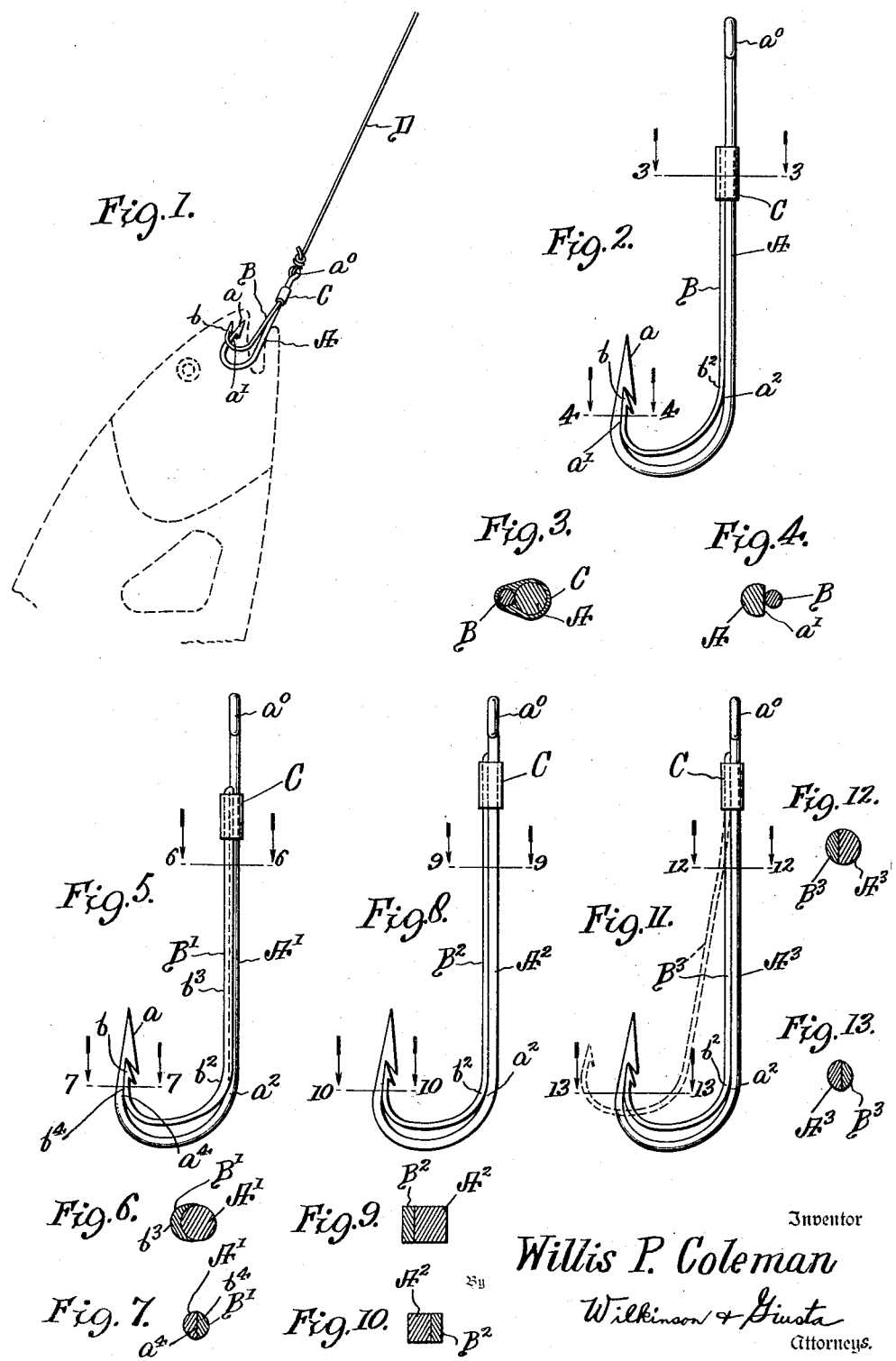

1,717,190

UNITED STATES PATENT OFFICE.

WILLIS PRAGUE COLEMAN, OF CHICAGO, ILLINOIS.

FISHHOOK.

Application filed April 5, 1928. Serial No. 267,633.

My invention relates to improvements in fish hooks, and its object is to make more certain the capture of a fish after he has been hooked.

Development of the modern type of fish hook antedates all historical writings. This development has always progressed along the line of making it more difficult for a fish, once he has taken the bait, to free himself from the line that holds the bait.

In the beginning a small stone was tied to a line and around this stone was wrapped the bait. Next a stone of small cross section and of a length several times the diameter of the stone was used. This stone was tied to the line around its center section, and then the bait was applied. The stone becoming lodged in the fish's gullet made it possible at times to pull him from the water.

Next a bent bone was used; and after that the small barb appeared, which has been perfected from time to time, until our modern fish hook has resulted.

In each step, the object has been to hold the fish until he could be withdrawn from the water. However, even at the present time a large number of fish that are apparently securely hooked manage to disengage the hook from their mouths and escape.

My invention carries this development another step forward by making is much more difficult for any fish to cast the improved hook from his mouth after the barb has pierced the flesh, especially the gristly portions surrounding the fish's mouth.

I attain this object by the use of a supplementary hook of smaller size (both as to cross section and over all dimensions) that is placed on the inside of the large hook, so that the upper, or shank end of the small, or inside hook, is firmly attached to the shank of the large, or outside hook, below the eye of the large hook. The inside hook then hugs closely the general contour of the large hook, with the exception noted below, until the point of the inside of the small hook rests within the inner cupped recess of the barb of the large hook. The natural spring of the inside hook holds it normally in place between the shank of the big hook and the securely seated barb.

The inside hook is so seated at the barb and immediately below it that no appreciable additional resistance is offered to its entrance into the tissue of the fish's mouth other than that of the barb of the ordinary type fishhook.

The exception mentioned above is this: At a point just below the tangent of the shank with the curve of the large hook, the inside hook leaves the contour of the large hook, and runs across the bottom of the large hook until it rejoins the contour of the large hook on the opposite side from the shank. By this departure, a clearance is left between the inside and outside hooks. It is obvious, then, when a fish is hooked, a part of his flesh will bear on the inside curve of the small hook where the clearance above noted occurs. From this pressure, the barb of the inside hook is unseated and the normal spring of the inside hook causes its barb to engage the flesh of the fish independently of the point and barb of the large hook. In this position it is difficult to shake loose the twin hook from the fish's mouth, due to the additional action of the outward spring of the point of the small hook, which causes it to serve like the keeper of a snap hook, and hold the barb of the large hook securely engaged in the flesh.

The resetting of the inside hook is easily and safely possible by applying pressure to the bottom part of the small hook, and then guiding the barb of the small hook into the recessed socket on the inside of the barb of the large hook.

My invention will be more fully understood after reference to the accompanying drawings, in which like parts are indicated by similar reference symbols throughout the several views, and in which, Figure 1 is a perspective view, showing the fish hook at the end of a line, and in the engaging position in the fish's mouth, the fish's head being shown in dotted lines.

Figure 2 shows the same hook on a larger scale, but in the unsprung or safety position, in which the point of the smaller hook is in engagement beneath the barb of the larger hook.

Figure 3 shows a section along the line 3—3 of Figure 2, and looking down.

Figure 4 shows a section along the line 4—4 of Figure 2, and looking down.

Figure 5 shows a modified form of a twin hook constructed according to my present invention.

Figure 6 shows a section along the line 6—6 of Figure 5, and looking down.

Figure 7 shows a section along the line 7—7 of Figure 5, and looking down.

Figure 8 shows a side elevation of a twin hook in another modified form of cross section.

Figure 9 shows a section along the line 9—9 of Figure 8, and looking down.

Figure 10 shows a section along the line 10—10 of Figure 8, and looking down.

Figure 11 shows another modification, the larger hook and the smaller hook in the engaging position in full lines, with the smaller hook in the sprung position in dotted lines.

Figure 12 shows a section along the line 12—12 of Figure 11, and looking down.

Figure 13 shows a section along the line 13—13 of Figure 11, and looking down.

Referring first to Figures 1 and 2, A represents the outer, or larger hook, having the usual barb $a$ and usual eye $a^0$, or other suitable device for fastening same to the fishing line D.

The inner face of the outer hook is somewhat flattened as at $a'$ in Figure 4 to engage the point $b$ of the smaller hook B. The hooks A and B may be secured together in any convenient way as by the collar C, which collar should be preferably not far below the top of the shank of the hook, as shown.

It will be noted that the shanks of the two barbs lie closely against each other until the points $a^2$ and $b^2$ are reached, see Figure 2, and then the inner hook is spaced apart from the outer or larger hook, so that when the line is drawn up sharply in hooking the fish, the barb of the hook will engage the flesh around the mouth of the fish.

This flesh will press down the free end of the inner hook causing it to spring clear of the outer hook, and assume the position shown in Figures 1 and 11.

When in this position, the smaller hook will tend to press the flesh of the fish up against the barb of the larger hook, acting like a keeper of a snap hook to prevent the bundle of tissue from becoming disengaged from the outer barb.

In the modification shown in Figures 5, 6 and 7, I have shown the outer hook A' having its shank substantially cylindrical, and engaging the concave side $b^3$ of the shank of the inner hook B'. The abutting edges of the two hooks near their barbs may be flattened as at $a^4$ and $b^4$ of Figure 7, if desired.

In the modification shown in Figures 8, 9, and 10, the two hooks $A^2$ and $B^2$ are shown substantially rectangular in cross section throughout, except at the barbs.

In Figures 11, 12 and 13, the abutting edges of the two hooks $A^3$ and $B^3$ are flattened and rounded, as shown.

Other cross sections of the hook may be provided, and the general shape of the hook may be varied at will, provided the barb of the inner hook is always held in normal engagement beneath the barb of the outer hook, and is adapted to be automatically released from such engagement, when the hook is put into operation, as in hooking a fish.

Thus it will be seen that I provide a twin hook arrangement, which may be caused to penetrate the flesh of the fish, with little, if any more pull on the part of the fisherman than is ordinarily expended in fishing with the single barb hook now commonly in use; and when the fish is hooked, the inner hook will be sprung out of engagement with the barb of the outer hook, and will serve as a keeper to prevent the fish from working loose.

While I have described one embodiment of the invention in its preferred form, it will be obvious that various changes might be made in the construction, combination and arrangement of parts, which could be used without departing from the spirit of my invention, and I do not mean to limit the invention to such details, except as particularly pointed out in the claims.

Having thus described my invention, what I claim and desire to secure by Letters Patent of the United States is:—

1. A device for use in line fishing, comprising an outer hook provided with a shank and a downwardly and rearwardly projecting barb, a smaller inner hook of resilient metal, also provided with a barb, having its shank secured to the first mentioned shank, and its barb in yielding engagement with and normally masked by the barb of said outer hook, but adapted to be released from engagement when a fish is hooked.

2. A device for use in line fishing, comprising an outer hook provided with a shank and a downwardly and rearwardly projecting barb, a smaller inner hook of resilient metal, also provided with a barb, having its shank secured to the first mentioned shank, and its barb in yielding engagement with and normally masked by the barb of said outer hook, the inner hook being spaced apart from the outer hook at a point below said barb.

3. A device for use in line fishing, comprising in combination an outer hook provided with a shank and a downwardly and rearwardly projecting barb, an inner hook of resilient metal, also provided with a barb, having its shank secured to the first mentioned shank, and its barb in yielding engagement with and normally masked by the barb of said outer hook, but adapted to be sprung from engagement when a fish is hooked.

4. A device for use in line fishing, comprising in combination an outer hook provided with a shank and a downwardly and rearwardly projecting barb, an inner hook of resilient metal, also provided with a barb, having its shank secured to the first mentioned shank, and its barb in yielding engagement with and normally masked by the barb of said outer hook, the inner hook being spaced apart from the outer hook at a point below said barb, and having its barb adapted to be sprung from engagement with the barb of the outer hook.

5. As an article of manufacture, a device for use in line fishing, comprising an outer hook provided with a shank and a downwardly and rearwardly projecting barb, an inner hook of resilient metal, also provided with a barb, having its shank secured to the first mentioned shank, and its barb in yielding engagement with and normally masked by the barb of said outer hook, but adapted to be automatically released therefrom.

6. As an article of manufacture, a device for use in line fishing, comprising an outer hook provided with a shank and a downwardly and rearwardly projecting barb, a smaller inner hook of resilient metal, also provided with a barb, having its shank secured to the first mentioned shank, and its barb in yielding engagement with and normally masked by the barb of said outer hook, the inner hook being spaced apart from the outer hook at a point below said barb, and having its barb adapted to be automatically released from the barb of the outer hook.

WILLIS PRAGUE COLEMAN.